Patented Nov. 24, 1936

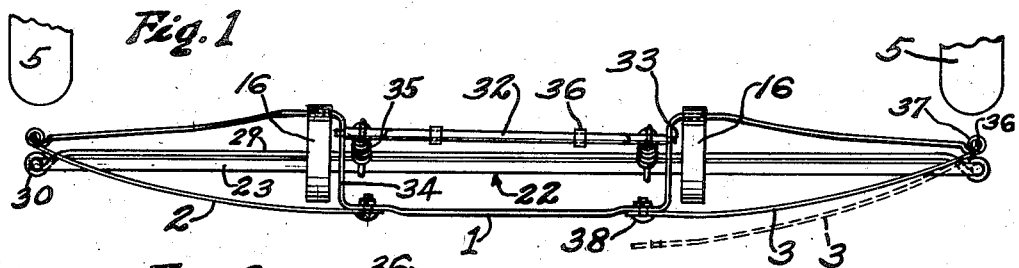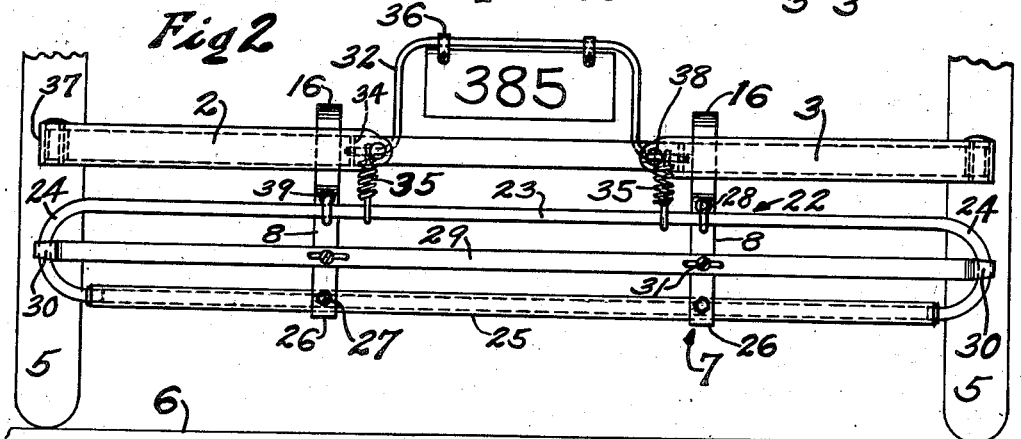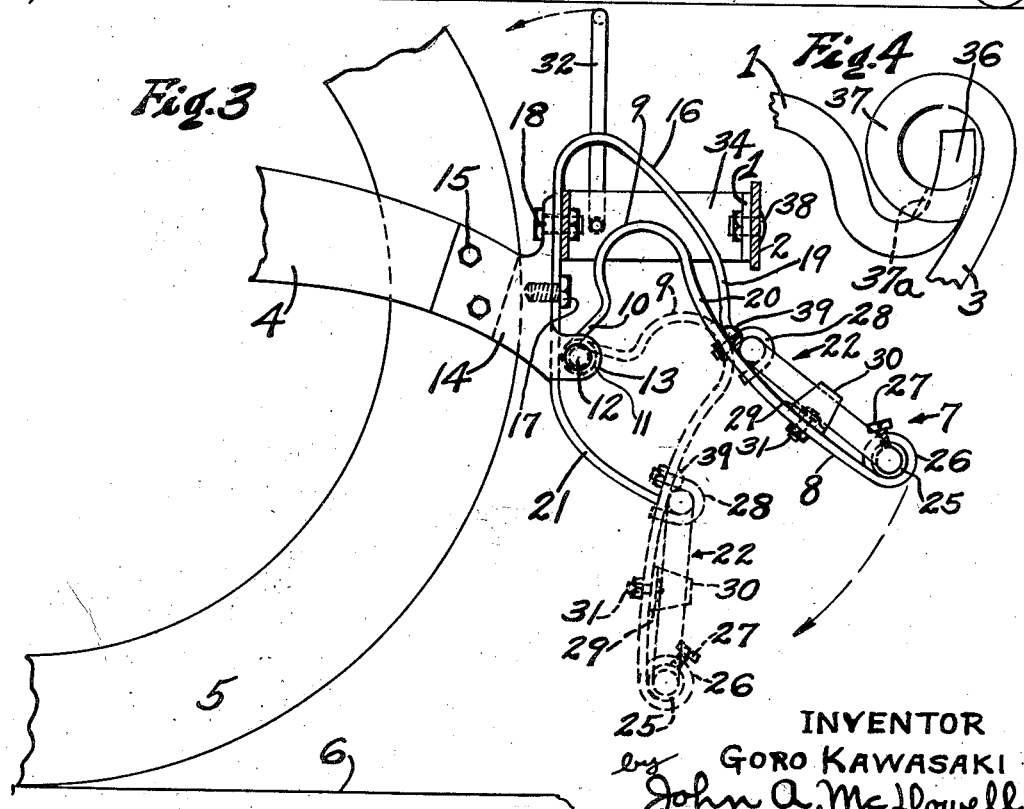

2,061,801

UNITED STATES PATENT OFFICE 2,061,801

SAFETY BUMPER

Goro Kawasaki, Los Angeles, Calif.

Application July 3, 1933, Serial No. 678,760

4 Claims. (Cl. 293—55)

This invention relates to improvements in bumpers for vehicles in which it is desired to prevent persons or objects from being run over by the wheels of the vehicle.

An object of the invention is to incorporate in the construction certain combination of elements and parts, as a part of the device, which will be durable to support the bumper in its normal or initial position and at the same time have the properties of resiliency permitting movement of the bumper upon meeting with resistance.

Another object of the invention is to provide a bumper which is relatively light in weight, exceedingly simple in structure, of inexpensive manufacture and neat in appearance.

Changes in the form, proportions and minor details of construction may be made within the scope of the claims without departing from the spirit of the invention.

Other objects, advantages and features of invention may appear from the accompanying drawing, the subjoined detailed description and the appended claims.

The accompanying drawing illustrates the invention.

Figure 1 is a plan view of the invention showing the position when the lower section is all the way down and one of the bumper arms is shown in broken lines partly detached to show how it may be replaced if necessary.

A fragment of each front wheel of a vehicle is also shown.

Fig. 2 is a front elevation of Fig. 1 showing the lower section in normal position and a license plate is also shown fixed to the frame above the bumper.

Fig. 3 is an enlarged fragmental detail elevational view partly in section showing in solid lines the lower section of the bumper in normal position and in broken lines the lowered position.

A fragment of a vehicle frame is shown to which the bumper is fixed and a portion of a wheel is also shown.

Fig. 4 is an enlarged fragmental plan detail view showing one of the joint connections of the upper bumper frame and frame member.

The invention comprises the resilient bumper frame 1 having detachable end guards 2 and 3 so constructed and arranged as shown in Figs. 1 and 4 to permit easy access for replacing either guard in case of breakage.

A fragment 4 of a chassis of a vehicle is shown to illustrate how the invention may be applied and fragments of the wheels 5 and ground 6 to set forth the location when the lower section 7 is in different operating positions.

The lower section 7 comprises the two spring arms 8 having at their upper end a semi-circular top 9 with a right angle extension 10 having a circular end 11 to form a hinge through which the bolt 12 fits.

The bolt is supported by the hinge ear 13 of the clamp 14 which is held to the chassis 4 by the bolts 15.

A spring stop support 16, of which there are two fixed to the clamps 14 by the bolts 17 and 18, is provided with an arm extension 19 that rides upon the outside concave part 20 and a semi-circular top 9 of the spring arms 8 to force and create at all times a spring pressure upon the lower section 7 and to hold it in lowered position as shown in Fig. 3 until it is raised to the normal carrying position.

The spring stop support 16 has at its lower end an arc extension 21 that protrudes outwardly and contacts the inside surface of the concave part 20 to form a stop for the lower section thus preventing any person or object from being run over by the wheels of the vehicle.

Mounted upon the spring arms 8 is a tubular frame 22 comprising a main tube 23 having semi-circular ends 24, such ends fitting into a sleeve 25 which is held in place by the round ends 26 of the spring arms 8 by the bolts 27.

The main tube 23 is held to the spring arms 8 by U-bolts 28 and is supported by the flat flexible bar 29 having each end 30 encircling the ends 24 and adjustably fixed to the spring arms 8 by bolts 31.

A license frame 32 has fulcrums 33 that are mounted in the side extensions 34 of the bumper frame 1 and coiled springs 35 are fixed to the license frame fulcrum at one end and to the main tube 23 at a tension to keep the license frame in upright position and to hold the lower section 7 in upright position.

Clamps 36 are provided to hold the license plate in place on the frame.

The resilient bumper frame 1 is fixed to the clamps 14 by the bolts 18 and is provided with hook constructed ends 36 that fit into the circular ends 37 through the slots 37a of the end guards 2 and 3 as shown in Fig. 4 of the drawing.

Bolts 38 hold the other ends of the guards 2 and 3 to the bumper frame 1 so that they may be removed in case of damage without taking the bumper off the vehicle.

A cushion 39 is provided on each spring arm 8 against which the arm extension 19 strikes to absorb any shock.

In operation a person or object strikes against the lower section 7 forcing it downward in the direction of the arrow to the position shown in broken lines in Fig. 3 of the drawing preventing the person or object from being run over by the wheels of the vehicle.

I claim:

1. In a device of the character set forth comprising a resilient bumper frame; clamps fixed to a chassis of a car and having hinge ears; a lower section comprising spring arms and a tubular frame hinged to said hinge ears to permit of vertical swinging of said lower section and tubular frame; spring stop supports fixed to said clamps and adapted to hold said spring arms and tubular frame when in normal and lowered positions; a license frame extending upwardly above said bumper frame and constructed to permit coil springs that are fixed to said lower section and to each end of said license frame at a tension to keep it in upright position and raise said lower section and to hold it in normal carrying position.

2. A device of the character set forth fixed to a chassis of a vehicle comprising a resilient bumper frame and a lower section comprising spring arms and a tubular frame; clamps fixed to the chassis and provided with hinge ears; said lower section being hingeably mounted to said hinge ears to permit of vertical swinging of said lower section; coil springs connecting said lower section to said bumper frame to raise said lower frame and hold it in normal carrying position and when a person or object strikes against said lower section lowers it to prevent the person or object from being run over by the wheels of the car.

3. A device of the character set forth comprising a resilient bumper frame and a lower section provided with spring arms having means of attachment to a chassis of a vehicle; coil springs connecting said lower section to said bumper frame to raise said lower section and hold it in normal carrying position; resilient means comprising a spring stop support provided at its lower end with an arc extension that protrudes outwardly and contacts the inside surface of a concave part of the spring arms and said stop support being also provided with an arm extension that rides upon a semi-circular top of the spring arms to hold the lower section in downward position and resist the pressure of a person's body against said lower section.

4. In a device of the character set forth fixed to a chassis of a vehicle comprising a flexible bumper frame; spring arms near each end of said frame; said spring arms provided at their upper end with a semi-circular top having a right angle extension provided with a circular end; clamps fixed to the chassis and having hinge ears; said spring arms being hingeably mounted to said hinge ears; a lower frame section comprising a main tube having semi-circular ends that fit into a sleeve which is mounted in round ends of said spring arms and adjustably held in place; spring stop supports fixed to said clamps provided with an arm extension that rides upon the outside of a concave part of said spring arms and said semi-circular top to force and create a spring pressure upon the lower section to hold it in lowered position, and coil springs fixed to said main tube of the lower section and to said bumper frame to raise said lower section and to hold it in normal carrying position.

GORO KAWASAKI.